US011131384B2

(12) United States Patent
Jordan et al.

(10) Patent No.: US 11,131,384 B2
(45) Date of Patent: Sep. 28, 2021

(54) SEAL ARRANGEMENT WITH IMPROVED LUBRICATION BEHAVIOR

(71) Applicant: Trelleborg Sealing Solutions Germany GmbH, Stuttgart (DE)

(72) Inventors: Holger Jordan, Neuhausen (DE); Mandy Wilke, Böblingen (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 101 days.

(21) Appl. No.: 16/523,955

(22) Filed: Jul. 26, 2019

(65) Prior Publication Data

US 2019/0346044 A1 Nov. 14, 2019

Related U.S. Application Data

(63) Continuation of application No. PCT/EP2018/053280, filed on Feb. 9, 2018.

(30) Foreign Application Priority Data

Feb. 17, 2017 (DE) ..................... 10 2017 202 608.1

(51) Int. Cl.
*F16J 15/16* (2006.01)
*F16J 15/3284* (2016.01)
*F16J 15/324* (2016.01)

(52) U.S. Cl.
CPC ......... *F16J 15/164* (2013.01); *F16J 15/3284* (2013.01); *F16J 15/324* (2013.01)

(58) Field of Classification Search
CPC ...... F16J 15/164; F16J 15/3284; F16J 15/324; F16J 15/3204; F16J 15/3232; F16J 15/3244
See application file for complete search history.

(56) References Cited

U.S. PATENT DOCUMENTS 2,188,857 A * 1/1940 Chievitz .............. F16J 15/3244
277/559
2,743,950 A 7/1951 Helfrecht et al.
(Continued)

FOREIGN PATENT DOCUMENTS

DE 20 19 585 A 11/1971
DE 23 51 066 B1 2/1975
(Continued)

*Primary Examiner* — Gilbert Y Lee
(74) *Attorney, Agent, or Firm* — Hackler Daghighian Martino & Novak

(57) ABSTRACT

A seal arrangement includes a first and a second machine part able to move relative to each other about a movement axis and forming a sealing gap. A seal element has a base section retained on a seal retaining groove structure of one of the two machine parts, and has a sealing head that bears with a sealing section in a dynamically sealing manner against a sealing face of the respective other machine part sealing a high-pressure side, that can be charged with pressurized fluid, of the sealing gap with respect to a low-pressure side of the sealing gap. The sealing head and the base section are connected by an elastically deformable connection section of the seal element, which has a non-linear cross-sectional profile and multiple regions of weakened material arranged spaced apart from one another in sequence, preferably regularly, in the circumferential direction of the seal element.

28 Claims, 17 Drawing Sheets

(56) References Cited

U.S. PATENT DOCUMENTS

| | | | | |
|---|---|---|---|---|
| 6,513,812 | B1* | 2/2003 | Yang | F16J 15/3264 |
| | | | | 277/561 |
| 7,959,159 | B2* | 6/2011 | Hocker | F02M 59/442 |
| | | | | 277/559 |
| 7,963,526 | B2* | 6/2011 | Dahlheimer | F16J 15/324 |
| | | | | 277/564 |
| 2008/0122184 | A1* | 5/2008 | Hocker | F16J 15/3236 |
| | | | | 277/366 |
| 2008/0217865 | A1 | 9/2008 | Sedlar et al. | |
| 2011/0140368 | A1 | 6/2011 | Keck | |
| 2016/0281855 | A1 | 9/2016 | Didwiszus | |

FOREIGN PATENT DOCUMENTS

| | | |
|---|---|---|
| DE | 20 2007 017302 U1 | 2/2008 |
| EP | 0 152 938 A2 | 8/1985 |
| JP | H03 81460 A | 8/1991 |
| JP | 2000 346 204 A | 12/2000 |
| JP | 2002 520 562 A | 7/2002 |
| JP | 2005 003 055 A | 1/2005 |
| JP | 2009 185 968 A | 8/2009 |

\* cited by examiner

SEAL ARRANGEMENT WITH IMPROVED LUBRICATION BEHAVIOR

CROSS-REFERENCE TO RELATED APPLICATIONS

This continuation application claims priority to PCT/EP2018/053280 filed on Feb. 9, 2018 which has published as WO 2018/149745 A1 and also the German application number 10 2017 202 608.1 filed on Feb. 17, 2017, the entire contents of which are fully incorporated herein with these references.

DESCRIPTION

Field of the Invention

The invention relates to a seal arrangement with an optimized lubricating behavior. The seal arrangement has a first and a second machine part, which are disposed spaced from one another while forming a sealing gap and disposed to be movable relative to one another about a movement axis. In this case, the seal arrangement comprises a seal element with a base section, which is disposed on or in a seal retaining structure, in particular in a retaining groove, of one of the two machine parts. The seal element has a sealing head, a sealing section of which sits against a sealing surface of the respective other machine part in a dynamic sealing manner to seal a high-pressure side of the sealing gap against a low-pressure side of the sealing gap, the high-pressure side being pressurizable with a fluid.

Background of the Invention

Such dynamic seal systems constitute essential construction elements in mechanical engineering as well as in vehicle construction. For example, the seal elements are used as radial or axial shaft sealing rings or as piston seals, in particular as hydraulic seal elements. At the same time, such seal elements are in practice exposed to ever-increasing operating pressures, temperatures and sliding speeds, not least due to the technical development of the units. The failure of seal elements results here in an undesirable leakage of the fluid to be sealed, which may have devastating consequences, in particular in critical applications. The seal elements must therefore meet increasingly higher demands with respect to their sealing capacity and should still also have an improved service life.

A reduction in the service life of the seal elements caused by friction is counteracted in practice primarily by optimized lubrication in the area of the sealing section of the seal element sitting against the sealing surface, by the use of material pairings with preferably minimal sliding friction, as well as an optimized heat dissipation in the area of the sealing zone. In this regard, the attempt is also being made to further improve the so-called drag-back capability of the seal elements.

During operation of the seal arrangements, in the area of the sealing zone or the sealing section of the seal element sitting against the sealing surface, thermal overloading of the lubricating oil, and as a consequence so-called formation of oil carbon deposits, can occur when lubricating oil is used. This occurs especially when using seal elements made of an elastomeric material with a high temperature resistance. These include in particular the so-called fluoroelastomers, which have become established in modern sealing systems. It is known to distinguish two types of formations of oil carbon deposits. For example, charred oil can settle directly on the seal or the sealing surface and accumulate there. If the accumulated oil carbon layer exceeds a certain thickness, the service life of the seal element is shortened. In addition, however, lubricating oil can also penetrate into the elastomer of the seal and lead here to the formation of oil carbon deposits. This makes the seal element less elastic in the area of its sealing section or its sealing edge, as the case may be. Finally, the seal element can no longer sufficiently compensate for vibrations of the machine parts or irregularities of the sealing surface, so that oil escapes. This second form of formation of oil carbon deposits has a significant impact on the life of the seal element. In addition, the deposited carbon can result in damage to the mating surface (shaft under-cut) and thus lead to wear and premature failure of the seal element.

It is the object of the invention to provide a seal arrangement and a seal element as mentioned above with further improved lubricating behavior, the arrangement and element being particularly suitable for low-pressure applications and high relative velocities of the seal element and the sealing surface and preferably counteracting any above-described formation of oil carbon deposits in the area of the sealing zone during operation.

SUMMARY OF THE INVENTION

The task relating to the seal arrangement is achieved by a seal arrangement having the features as specified in claim 1. The seal element according to the invention is specified in claim 24.

The seal arrangement according to the invention is characterized essentially by the fact that the sealing head and the base section are connected to each other via an elastically-deformable connecting section of the seal element having a U-shaped non-linear cross-sectional profile and a plurality of material-weakened areas disposed in the circumferential direction of the seal element, preferably uniformly spaced from each other in succession. In the case that the seal element—with respect to the axis of movement of the two machine parts—is designed in a radially sealing manner, i.e. as a so-called radial shaft seal ring or piston seal ring, the connecting section has a non-linear, i.e. curved cross-sectional profile in the radial direction. In the event that the seal element is formed in an axially sealing manner, i.e., as a so-called axial shaft seal ring, the connecting section accordingly has a non-linear, i.e. curved, cross-sectional profile in the axial direction. By means of such a cross-sectional profile of the elastic, in particular rubber-elastic, deformable connecting section, for one thing vibrations of the machine part which comprises the seal retaining structure, as well as irregularities of the sealing surface can be reliably absorbed or compensated by means of the connecting section. As a result, local overloading of the sealing section or the sealing edge of the sealing head can be avoided and a reliable sealing capability of the seal element can be achieved. In addition, a particularly compact design of the seal element can be realized thereby. This is advantageous for the possible range of use of the seal arrangement. The sealing section of the sealing head comprises at least one tread, which extends away from the end face of the sealing head. This tread thus protrudes beyond the contour of the end face of the sealing head. The tread can be rounded in the unloaded state, i.e. be designed with a radius, or can have sealing edges on both sides. According to the invention, the sealing strip is provided with a continuous, preferably macroscopically unstructured, tread surface. The tread surface sits against the sealing surface. If the connecting section forms a clearance open towards the high-pressure side, then the seal element can be pressure-activated by high-pressure-side pressurization of the seal arrangement. In other words, the sealing head is pressed against the sealing surface at a pressure proportional to an operating pressure prevailing on the high-pressure side. Advantageously, the connecting section has (at least in sections) a bow-shaped or meandering, i.e. U- or V-shaped, cross-sectional profile.

In addition, by the material weakenings of the elastic, preferably rubber-elastic, deformable connecting section provided in the circumferential direction of the seal element, a particularly efficient lubrication and thus cooling of the sealing zone, i.e. of the contact zone of the sealing section and the sealing surface, can be achieved. This counteracts the formation of carbon deposits in the area of the dynamic sealing zone of the seal arrangement. The material weakenings of the connecting section provide a lower torque support to the sealing head during operation of the seal arrangement than the non-material-weakened areas of the connecting section. These are disposed interposed between the material weakenings in the circumferential direction of the seal element. In a relative movement of the two machine parts, this results in a contact pressure profile of the sealing section at the sealing surface in the circumferential direction, the profile corresponding to the spatial distribution pattern of the material-weakened areas and the non-material-weakened areas of the connecting section. The contact (surface) pressure of the sealing section of the sealing head, which is alternating or non-constant in the circumferential direction, allows for improved lubrication of the wear-prone sealing section due to the fluid located on the high-pressure side of the sealing gap or the seal arrangement. This occurs without negatively affecting the sealing behavior of the seal element.

According to the invention, the pre-stressed sealing seating of the sealing head against the sealing surface, which is determinative of the sealing ability of the seal element can be effected wholly or partially by the connecting section. In both cases, therefore, the sealing head is pressed against the sealing surface by the connecting section which is necessarily supported by the base section on the machine part comprising the seal supporting structure. In this case, the base section sits against the machine part comprising the seal retaining structure in an axial or radial direction in a statically sealing manner. Due to the weakening of the material of the connection section according to the invention, in both cases the non-constant/alternating contact pressure profile of the sealing section at the sealing surface corresponding to the spatial distribution pattern of the material weakenings is further enhanced. The sealing section of the sealing head sits with the sealing section (surface) areas which align with the material weakenings of the connecting section in a direction orthogonal to the sealing surface against the sealing surface at a smaller contact (surface) pressure than with those areas which align with the non-weakened areas of the connecting section in a direction orthogonal to the sealing surface. As a result, the self-lubrication of the seal arrangement in the area of the sealing zone, i.e., a sufficient lubricating layer in the area of the contact zone between the sealing head and the sealing surface, and thus the service life of the seal element, can be further improved.

The connecting section according to the invention in the material-weakened areas preferably each have a thickness which is less than 90%, in particular less than 50% of the maximum thickness of the connecting section. The material-weakened-areas are therefore not bores of the connecting section, but always seal the high-pressure side against passage of the fluid to the low-pressure side. The connecting section may be integrally formed on the sealing head in the middle or alternatively on the edge, in particular on the low-pressure-side edge of the sealing head. In the former case, therefore, in the case of a radially-sealing seal element with respect to the movement axis in the axial direction and an axially-sealing seal element in the radial direction, the sealing head extends laterally past the connection area of the connecting section. Thereby, the sealing section of the sealing head can be pressed in a simple manner circumferentially in a direction orthogonal to the sealing surface against the sealing surface. In both cases, space is created for further functional or add-on parts of the seal element.

Thus, the sealing head according to the invention may comprise at least one support structure, in or on which a (rubber) elastically-deformable biasing element, in particular a worm spring or an elastomeric ring, is held, by which the sealing head is clamped against the sealing surface. Such a biasing element may be provided according to the invention additionally or alternatively to a biasing of the sealing head against the sealing surface mediated by the connecting section. According to the invention, the support structure is preferably disposed on the rear side of the sealing head facing the base section. Under production engineering aspects as well as with regard to a simple and secure mounting of the seal element, the support structure is advantageously designed as an annular groove. If the sealing head has only one such a support structure, then this is advantageously positioned on the high-pressure side of the sealing head. This can ensure even more reliable sealing ability of the seal element.

According to a preferred development of the invention, the sealing head, preferably at the rear side thereof facing the base section, has such a support structure on both sides of the connecting section, i.e. on the low-pressure side and on the high-pressure side.

According to a first alternative embodiment, in each case a (rubber) elastically-deformable biasing element for the sealing head, in particular a worm spring or an elastomer ring, can be held in/on the two support structures. By way of the biasing elements, which are spaced apart, the sealing section of the sealing head can be pressed against the sealing surface particularly reliable and in stable fashion against tilting.

According to a second alternative embodiment, a support ring may be held in/on the support structure disposed on the low-pressure side and an elastically-deformable biasing element, in particular a worm spring or an elastomer ring, can be held in/on the high-pressure-side support structure. The support ring is rigid in comparison to the material of the seal element or the sealing head in itself, i.e. dimensionally stable in the radial and axial direction. Due to the elastically-deformable material of the sealing head, the support ring can secure the sealing head in its sealing position on the sealing surface. In view of the elastically-deformable material of the sealing head, the support ring can also act at a corresponding dimension in terms of a biasing element for the sealing head. The support ring may also provide axial or radial support of the sealing head and/or the connecting section of the seal element on the low-pressure side, thus ensuring the operability of the seal element even at high operating pressures of the fluid. By means of the biasing element disposed on the high-pressure side, sufficient contact pressure of the sealing head against the sealing surface can be made possible in the operational use of the seal arrangement.

For a particularly simple and permanent attachment of the aforementioned biasing element/s or the support ring, the annular groove according to the invention preferably has an opening with a smaller opening cross section compared to the inner diameter of the annular groove. The aforementioned attachments can be clipped into annular groove in the assembly of the seal arrangement in a simple manner and captively secured to the seal element.

According to a further development of the invention, the support ring can be provided, if necessary, with a wiping or sealing lip to counteract an entry of contaminants from the low-pressure side to the high-pressure side of the sealing gap. As a result, the seal arrangement is even better suited for use in highly polluted environments. The wiping or sealing lip sits preferably peripherally against the machine part having the sealing surface.

The sealing head can be realized according to the invention with different cross-sectional profiles. Thus, the sealing head may have an oval, elliptical or even polygonal cross-sectional profile. Preferably, the sealing head has an end face convexly shaped in cross section, which faces the sealing surface. The sealing head is thus spherically shaped on the sealing surface side.

The formation or deposition of oil carbon in the area of the sealing section can be counteracted even more effectively according to the invention by providing the seal element with at least one flow generator or a flow element on the high-pressure side, in particular on its front side or on the side flank facing the high-pressure side, said seal element effecting a fluid flow in the sealing gap in a relative movement of the two machine parts such that the fluid approaches the sealing head on the high-pressure side in the area of its sealing section of the sealing head. Accordingly, during operation of the seal arrangement, a flushing flow of the fluid located on the high-pressure side is generated directly or indirectly by the flow element, the flow pointing at the sealing zone of the seal arrangement. The flow element generates a pressure difference in the fluid. As a result of this pressure difference, the fluid is accelerated either directly towards the dynamic sealing zone of the seal arrangement or away from the sealing zone. In the latter case, fluid flowing to the sealing zone approaches the sealing zone. In the case of a rotational relative movement of the two machine parts, either the seal element together with the machine part with the seal retaining structure rotates relative to the sealing surface, or the machine part with the sealing surface rotates relative to the seal element. In the latter case, the fluid is caused, by its friction against the sealing surface and its inherent viscosity to flow directed around the axis of rotation of the sealing surface (so-called Taylor Couette flow). If the machine part with the sealing surface—with respect to the axis of movement of the two machine parts—is the machine part lying in the radial direction and set in rotation, then at higher rotational speeds the fluid accelerated at the machine-part with the sealing surface additionally pushes outwards due to the centrifugal force. This creates so-called Taylor vortices, which are perpendicular to the axis of movement of the two machine parts and cause a mixing of the fluid.

The fluid approaches the fluid element at a relative movement of the two machine parts along/about the movement axis and the fluid element generates a flow in the fluid which in the case of a radially sealing seal element in the axial direction and in the case of an axially sealing seal element in the radial direction (in each case with respect to the movement axis of the two machine parts) is directed toward the sealing section of the sealing head or away from the sealing section. In the former case, the sealing section or the sealing zone is approached by the fluid which is redirected through the flow element to the sealing section. In the latter case, the sealing section or the sealing zone is approached by fluid flowing to the sealing zone.

Overall, this allows a further improved lubrication, cooling and additionally an active flushing in the area of the sealing section of the sealing head or the sealing zone sitting against the sealing surface. The formation and deposition of oil carbon on or embedment of oil carbon in the sealing section of the seal element can be effectively counteracted thereby. Any oil carbon deposits already formed and possibly accumulated at the sealing section of the seal element may possibly even be flushed out of the sealing zone by the fluid.

The flow element may be formed according to the invention in particular as a groove of the seal element. Such a groove can be produced simply and cost-effectively in the case of the original molding methods used in the manufacture of seals, in particular by way of injection molding.

According to an alternative embodiment of the invention, the flow element can also be designed as a penetration hole through the seal element or sealing head, the hole being oriented obliquely at least in areas in the direction of movement of the two machine parts. The aforementioned groove or penetration hole are preferably designed to be open on both ends according to the invention.

For a particularly efficient flushing effect in the area of the sealing zone, the groove or the penetration hole according to the invention can narrow from the high-pressure side in the direction of the low-pressure side or the sealing section of the sealing head, at least in sections, in its cross-section through which the fluid can flow. As a result, the groove can act in the sense of a nozzle and accelerate the fluid even more effectively in the direction of the sealing section. The fluid can thereby be fed to the sealing section at high flow velocity this way via the groove. Overall, the desired flushing effect of the fluid can be further increased thereby, so that already formed oil carbon can be more effectively detached from the sealing section or the sealing surface and removed from the sealing area.

The groove can also be designed according to the invention as a blind channel open to the high-pressure side. In this special case, the fluid is deflected at the end of the groove facing the low-pressure side more or less abruptly in the direction of the sealing surface. The groove may have at its end facing the low-pressure side a ramp-shaped inclined surface for the fluid, the surface being disposed obliquely relative to the sealing surface.

The groove or the penetration hole may be fluidly connected to an annular flow channel of the sealing head on the sealing section side, i.e. the groove can open into this annular flow channel of the sealing head. As a result, the sealing section can be completely surrounded by the fluid in the circumferential direction on the high-pressure side. This is advantageous for heat dissipation in the area of the sealing zone. This also achieves a further optimized flushing of the sealing zone. The annular flow channel is advantageously directly limited laterally (in the direction toward the low-pressure side) by the sealing section of the sealing head which sits against the sealing surface.

According to a preferred embodiment of the invention, the flow element of the sealing head extends away from the sealing head. The flow element is thus designed in the sense of a profile extension of the sealing head. The flow element is preferably formed directly under production engineering aspects on the sealing head. As a result, the flow element is at the same time held captive on the sealing head. The flow element acts in the sense of a blade arrangement (a blade) of the sealing head. The flow element may have an oval, elliptical, polygonal or triangular cross-sectional profile. A free-form cross-sectional profile in the sense of a wing profile is conceivable. The (thrust) effect of the flow element designed as a profile extension of the seal element can be adjusted as required by appropriate dimensioning and shaping of the surface(s) of the flow element which can be approached by the fluid or is approached thereby during operation. By a suitable choice of the slope of the inflow surface(s) of the flow element relative to the movement axis or relative to the local radius of the seal element and a possible inclination of the inflow surface(s) of the flow element, the acceleration of the fluid can be influenced by the flow element. The flow element can also be bidirectionally effective, in particular in the case of rotationally movable machine parts, i.e., it can effect a fluid flow directed along the sealing gap in both directions of movement of the machine parts relative to each other.

According to the invention, the flow element may be disposed circumferentially on the sealing head and/or at least in sections on a side flank of the sealing head.

The lubrication and cooling of the sealing section of the seal element according to the invention can be further improved by the fact that the seal element is provided with a plurality of flow elements. As a result, at the same time the emergence and deposition/embedment of carbon at the sealing section of the seal element can be counteracted even more effectively. Thus, in particular one or more groove-shaped and/or one or more flow elements extending away from the seal element can be disposed on the sealing head combined with each other. The groove-shaped flow element(s) may, for example, be disposed on the end face of the sealing head facing the sealing surface and the flow element(s) extending away from the sealing head may be disposed on a side flank of the seal element or the sealing head. In particular, by virtue of the flow elements extending away from the sealing head, a mixing of the fluid which is advantageous under thermal aspects can be achieved at the same time. To the extent that turbulent flow areas within the fluid are caused by the flow elements, larger particulate impurities (for example, oil carbon agglomerates) can also be comminuted and slurried in the fluid. The risk of damage to the sealing head or the sealing surface (scoring) can thus be further minimized.

The plurality of flow elements may be disposed in the circumferential direction of the seal element in a single-row or even multi-row on the sealing head. According to a particularly preferred embodiment, the flow elements can be disposed at least partially along a helical or spiral line lined up one after the other on the sealing head. The seal elements disposed in this way can thereby interact particularly effectively. As a result, even with compact dimensions of the individual flow elements on the high-pressure side of the seal element, a functionally sufficiently large flow of fluid can be achieved.

It should be noted that the seal element may have low-pressure-side return elements, which are disposed on the sealing head. As a result, fluid passed from the high-pressure side to the low-pressure side can be conveyed back to the sealing section of the sealing head, thereby further improving the lubrication, cooling and also the drag-back capability of the seal element. The return-conveying elements may be groove-shaped or also shaped as profile extensions in a manner corresponding to the aforementioned flow elements of the seal element.

The seal element may according to the invention at least partially, preferably completely, consist of an elastomeric material.

It should also be noted that the seal retaining structure may be formed with respect to a further simplified assembly of the seal arrangement by a cartridge. The cartridge may be made of metal or other suitable material.

The seal element according to the invention allows improved self-lubrication, self-cooling and counteracts the operation of a formation of oil carbon deposits and removal or storage at its sealing section. Overall, the seal element can thereby achieve a longer service life, in particular in high-speed applications.

BRIEF DESCRIPTION OF THE DRAWINGS

The invention will be explained in more detail with reference to an embodiment shown in the drawing. The drawings show.

DETAILED DESCRIPTION OF THE PREFERRED EMBODIMENTS

Figure 1:
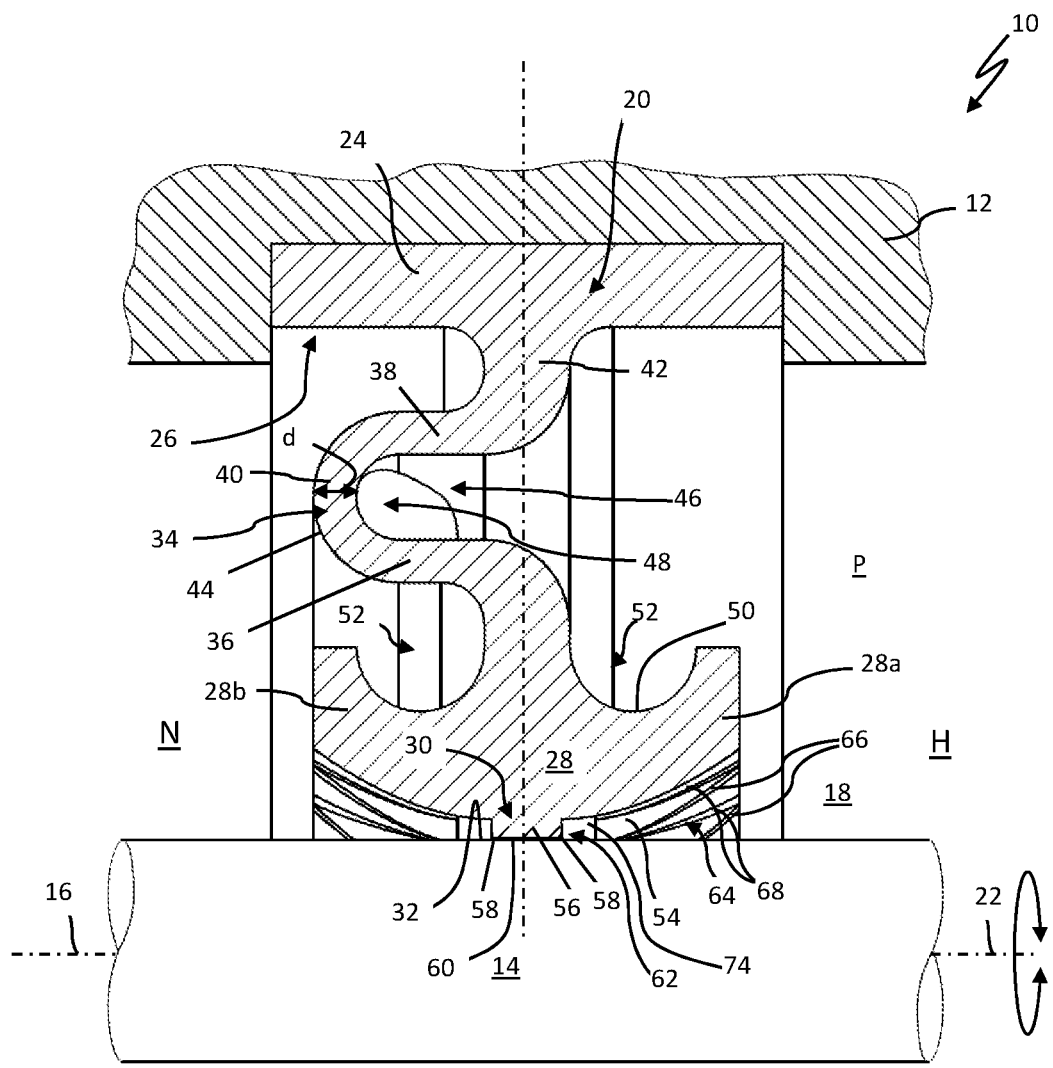
FIG. 1 a seal arrangement with two machine parts which can move relative to one another about a movement axis, and with a seal element which sits against a sealing surface of one of the two machine parts in a dynamically sealing manner in the radial direction, wherein the seal element has a base section and a sealing head which are connected to each other via a sectionally bow-shaped or in cross section U-shaped elastically-deformable connecting section which is provided in the circumferential direction with multiple material weakenings.

FIG. 1 shows a seal arrangement 10 with a first and a second machine part 12, 14 which are disposed about a movement axis designated 16 movably relative to one another, in this case rotatably. Between the two machine parts 12, 14, a sealing gap 18 is formed. The sealing gap has a high-pressure side H to be sealed, in which a fluid is located which can be acted upon by a pressure P, in particular a lubricant, such as oil for example. The high-pressure side H is sealed against a low-pressure side N of the sealing gap by means of a seal element 20. The seal element 20 is designed here as a so-called radial shaft sealing ring.

The seal element 20 may consist overall of an elastically-deformable material, preferably an elastomer, and is preferably made in one piece. The central axis of the seal element 20 is designated by 22. The central axis of the seal element coincides here with the movement axis 16 of the two machine parts 12, 14. It is understood that in the material of the seal element 20 supporting or reinforcing parts (not shown) may be partially or completely embedded. A base section 24 of the seal element 20 is held on a seal retaining structure, here a retaining groove 26, of the first machine part 12. The base section 22 may rest on the first machine part 12 in the radial and/or axial direction as a static seal. The base section 24 is here kept clamped in the seal retaining structure. The base section 24 may also be secured to, for example, pinned or adhesively bonded to the machine part 12, 14 with the seal retaining structure in other ways known to those skilled in the art.

Figure 5:
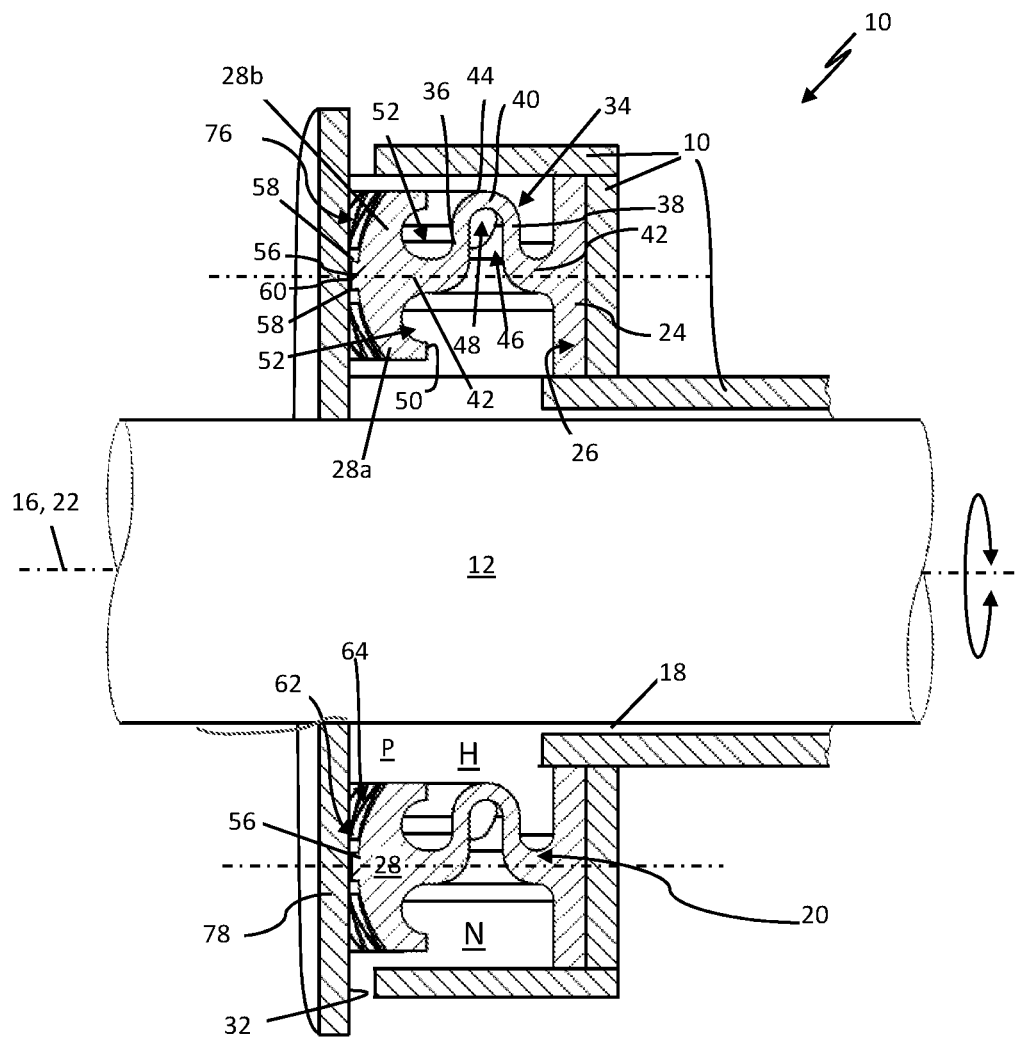
FIG. 5 a sealing arrangement similar to the sealing arrangement according to FIG. 1, in which the seal element is designed to be dynamically sealing in the axial direction in relation to the movement axis of the two machine parts.

The seal element 20 further comprises a sealing head 28, a sealing section 30 of which sits against a sealing surface 32 of the second machine part 14 in a circumferentially dynamic seal. It should be noted that the seal element 20 formed as a radial shaft sealing ring according to FIG. 1 can be designed to be internally sealing or externally sealing. The sealing head sits against the sealing surface 32 of the second machine part 14 in a sealing manner in a direction which is radial relative to the movement axis. It is understood that the seal element 20 may also be designed to be axially sealing with respect to the movement axis 16 of the two machine parts 12, 14, as explained in more detail below in connection with FIG. 5.

The sealing head 28 and the base section 24 are connected to each other via a rubber-elastic deformable connecting section 34. The connecting section 34 is designed as meandering or bow-shaped and thus in sections has a U-shaped cross-sectional profile. A first and a second leg 36, 38 of the connecting section each extend parallel or substantially parallel to the sealing surface 32 and are connected to each other via a back portion 40 of the connecting section 34. The two legs 36, 38 each have an angled end piece 42 which extends here in a direction radial to the movement axis, i.e. in a direction orthogonal to the sealing surface 32, and which is formed on the base section 24 and on the sealing head 28. The back portion 40 may have a convex outer side 44 facing the low-pressure side. In the case of the radially sealing seal element 20 shown here, the connecting section 34 thus has a non-linear cross-sectional profile in a direction radial to the movement axis 16. In the case of an axially-sealing seal element, the connecting section accordingly has a non-linear cross-sectional profile in the axial direction. The connecting section 34 can create, at least partially or, as is the case here only, a biased sealing contact of the sealing head 28 on the sealing surface 32. Thus, in the illustrated embodiment the sealing head 28 is biased against the sealing surface 32 solely by virtue of the elastic resilience inherent in the material of the connecting section 34. Due to the membrane-like design of the connecting section 34, the sealing head 28 is mounted floating in a radial direction relative to the axis of movement. As a result, the seal element 20 can compensate for any eccentricity of the second machine part 14 without resulting in a local overstressing of the sealing section 30. It should be noted that due to the bow-shaped or meandering connection section between the legs of the connecting section 34, an annular clearance 46 is formed. A clearance is understood to mean a volume of space in which no component of the seal arrangement is disposed. This clearance 46 surrounds the sealing head circumferentially. The clearance 46 is directly limited in a direction orthogonal to the sealing surface 32 solely by the two legs 36, 38 of the connecting section 34 and fluidly connected to the high-pressure side H of the seal arrangement 10. If the high-pressure side H and thus also the clearance 46 are subjected to a pressure P, then the sealing head can be pressed against the sealing surface 32 in a pressure-proportional manner relative to the pressure P prevailing on the high-pressure side H in each case. The seal element 20 is thus overall pressure-sensitive.

The connecting section 34 has a plurality of material-weakened areas 48 which are disposed in the circumferential direction of the seal element 20, preferably uniformly spaced from each other in succession. In FIG. 1, the seal element 20 is shown in a sectional view at the level of such a material-weakened area 48.

Figure 2:
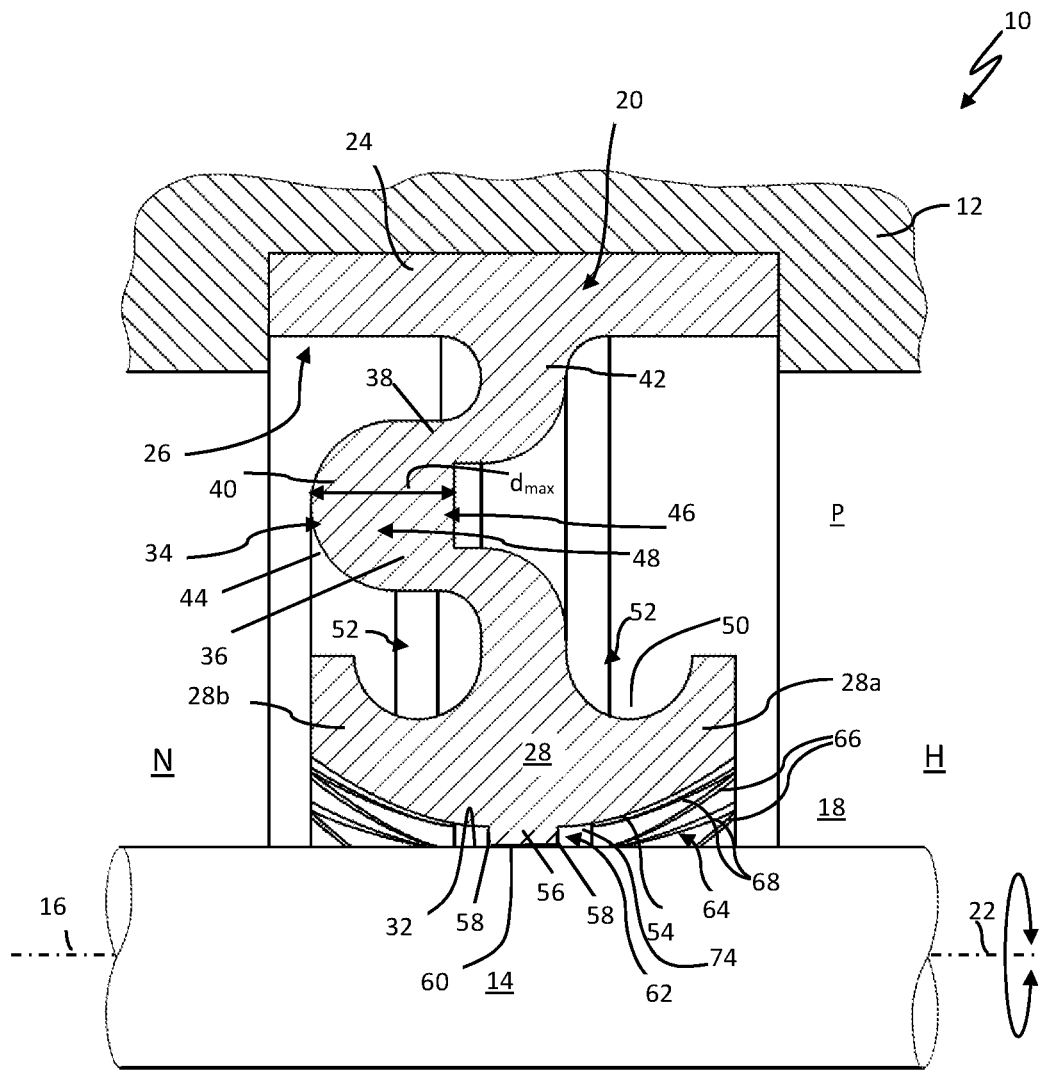
FIG. 2 the seal arrangement of FIG. 1 in a different sectional view, wherein the connecting section of the seal element is shown in section in a non-material-weakened area.

FIG. 2 shows the seal element 20 in another sectional plane, in which no material-weakened area 48 of the connecting section 34 is sectioned. According to FIG. 1, the material-weakened areas 48 can be disposed at the level of the back portion 40 (here in the radial direction) or shifted toward the seal retaining structure or the sealing surface 32.

In the material-weakened areas, in each case the connecting section 34 has a thickness d which is less than 90%, preferably less than 50% of the maximum thickness dmax of the connecting section 34 in its non-weakened areas. Note that the connecting section 34 is free of through bores or the like. The connecting section 34 is therefore generally fluid-impermeable.

The connecting section 34 is formed on the sealing head 28 centrally according to FIGS. 1 and 2. Therefore, the sealing head 28 has one side of the head 28a arranged on the high-pressure side and one side of the head 28b arranged on the low-pressure side. The sealing head 28 also has a support structure at the back side 50 facing the base section 24 on both sides of the connecting section 34, i.e. the low-pressure side and the high-pressure side. The support structure can be designed in each case as a circumferential annular groove 52 which serves to accommodate other possible attachments, about which more will be discussed in detail below.

The sealing head 28 has a total spherical cross-sectional profile with an end face 54—convexly shaped here. The sealing section 30 here comprises a tread 56. The tread 56 extends away from the end face 54 of the sealing head 28 in the direction of the sealing surface 32. The tread may have a rectangular cross-sectional profile with two sealing edges 58, as shown in FIGS. 1 and 2. It should be noted that the tread has a continuous annular tread surface 60 which sits against the sealing surface 32. The tread surface 60 is preferably designed to be unstructured macroscopically.

For active cooling, lubrication and flushing of the sealing zone of the seal arrangement 10 designated by 62, the end face 54 of the seal element is provided on the high-pressure side with a profile system 64. The profile system here comprises a plurality of first and second flow elements 66, 68. As a result of these first and second flow elements 66, 68, a fluid flow is caused on the high-pressure side H of the sealing gap 18 during a relative movement of the two machine parts about the movement axis 16—bidirectionally—, through said gap the sealing head 28 is approached by the fluid on the high-pressure side in the area of the sealing zone 62.

Figure 3:
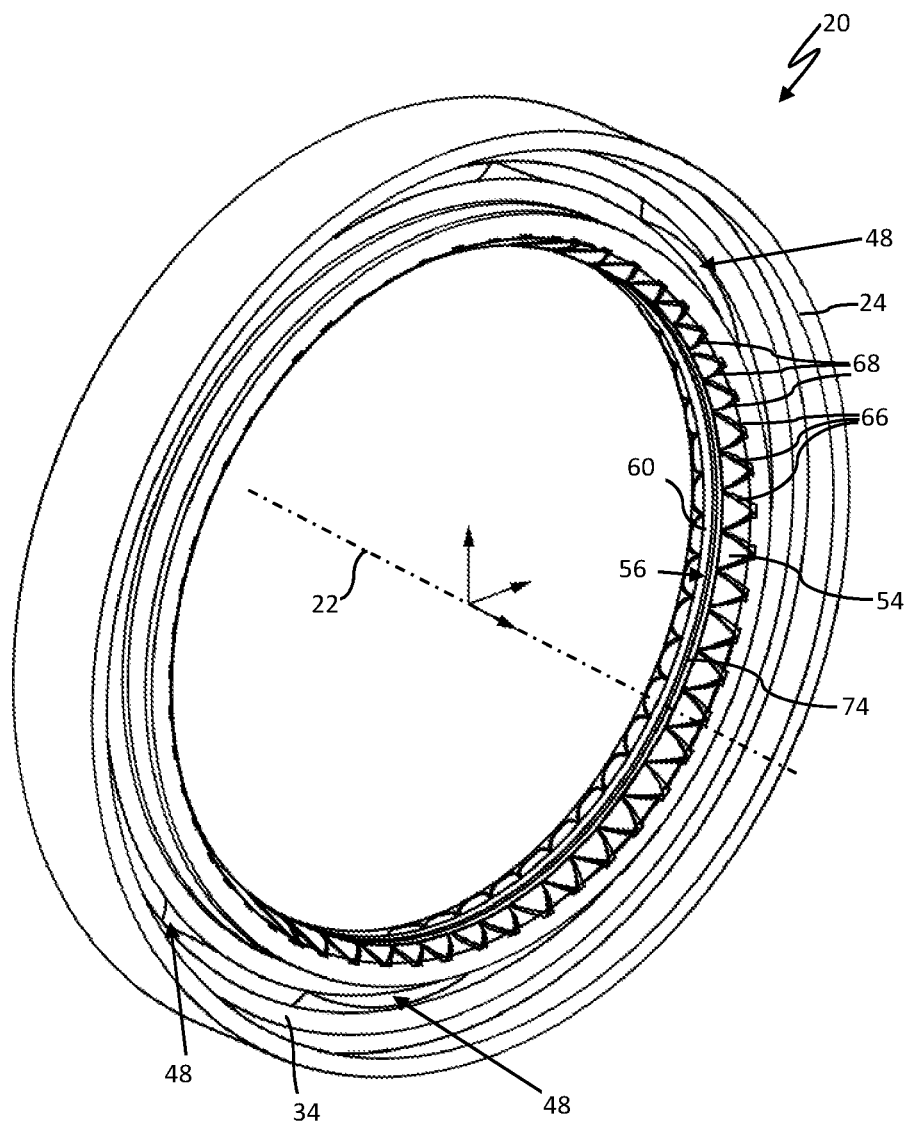
FIG. 3 the seal element of the seal arrangement of FIG. 1 in an exposed perspective view showing groove-like flow elements causing a flow directed at the sealing section of the sealing head during operational use of the seal element.
Figure 4:
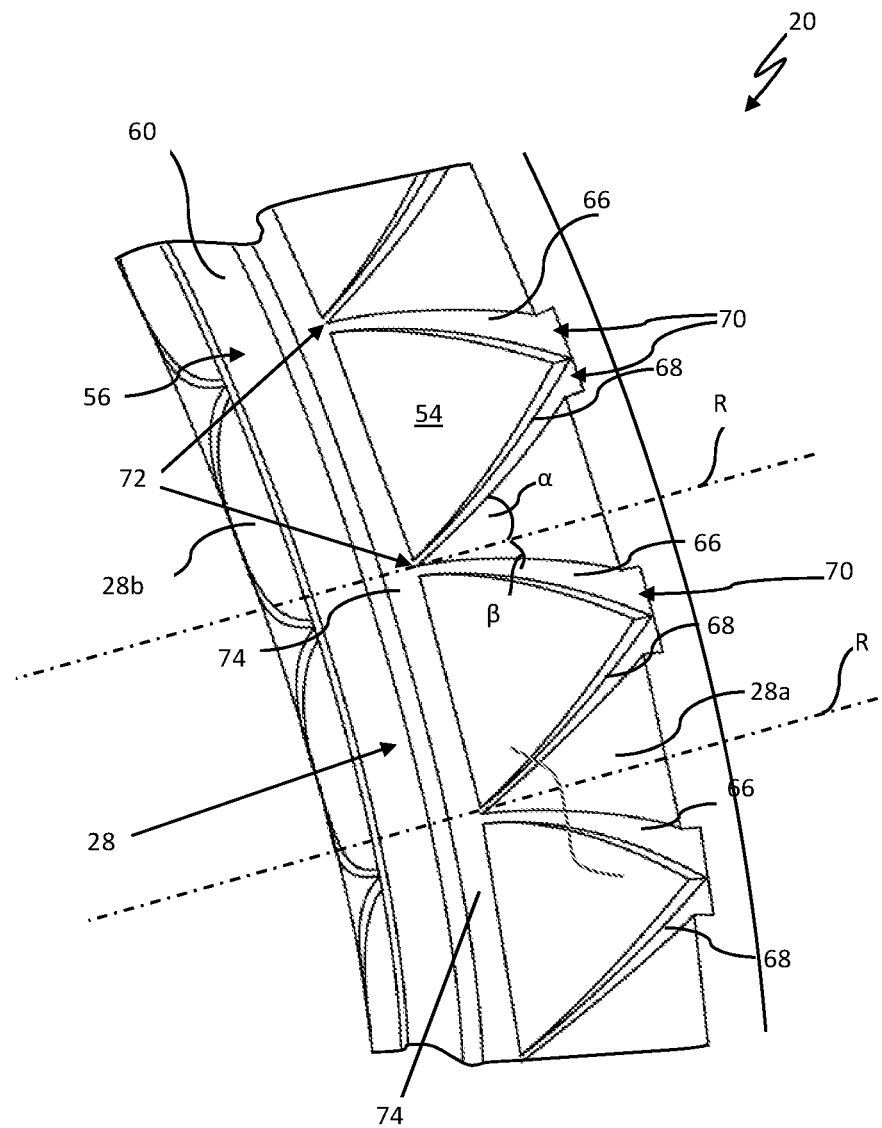
FIG. 4 a detailed section of the seal element according to FIG. 3.

FIG. 3 shows the seal element of the seal arrangement according to FIGS. 1 and 2 in an exposed view. FIG. 4 shows a detail section of the seal element 20. The first and second flow elements 66, 68 are each embodied here as a tread groove or groove of the sealing head 28 by way of example. Here, for example, the first flow elements 66 are disposed in the circumferential direction of the seal element 20 spaced apart on the sealing head 28 in succession. In the process, the first flow elements 66 are inclined toward a first side relative to the (local) radial direction R of the respective flow element in each case. The first flow elements each include an angle α of approximately 20° with the (local) radial direction. The second flow elements 68 are also disposed on the sealing head 28 spaced apart in the circumferential direction of the seal element 20. The second flow elements 68 are in this case inclined toward a second side relative to the (local) radial direction R of the respective second flow element 68 in each case. The second flow elements 68 each include an angle β of approximately 20° with the (local) radial direction. The aforementioned angles α and β can be between 15° and 45°, in particular between 20° and 40°. It is understood that the first flow elements 66 can be inclined at least partially with different angles α relative to the local radial direction R. The same applies to the second flow elements 68.

The first and second groove-shaped flow elements 66, 68 each have a high-pressure-side first opening 70 and a second opening 72 facing the low-pressure side. The groove-shaped first and second flow elements 66, 68 each extend here in an axial direction relative to the movement axis 16 (FIGS. 1 and 2) in the direction of the low-pressure side N or in the direction of the sealing section 30 of the seal element 20, thus in the direction of the sealing zone 62. The grooves can open into an annular flow channel in the form of an end-side circumferential groove 74 of the sealing head 28. The end-side circumferential groove 74 here is directly limited in the direction toward the low-pressure side N by the tread 56. It should be noted that the end face 54 of the sealing head in the area thereof comprising the first and second flow elements 64, 66 is disposed at a distance from the sealing surface 32.

The groove-shaped first and second flow elements 66, 68 can in each case narrow in their cross-section through which the fluid can flow in the direction of the sealing section 30 of the sealing head 28. This cross-sectional narrowing can be achieved by reducing the respective width and/or the respective depth of the grooves along the course thereof in the direction toward the sealing section 30 of the sealing head 28.

In the operational use of the seal arrangement 10, either the seal element 20 and the seal retaining structure comprising machine part 12, 14 rotate relative to the sealing surface 32, or the machine part 12, 14 comprising the sealing surface 32 rotates relative to the seal element 20. In the former case, depending on the direction of rotation, the fluid is conveyed in the axial direction via the first or via the second groove-shaped flow elements 66, 68 to the sealing zone 62 and thus to the sealing section 30. In the latter case, due to its friction at the sealing surface 32 and by its inherent viscosity, the fluid is caused to flow around the movement axis 16 (Taylor Couette flow).

The first/second flow elements 66, 68 are thus approached by the fluid during a relative movement of the two machine parts 12, 14 around the movement axis 16 and generate a flow in the fluid which in the illustrated radially-sealing seal element is directed—in relation to the axis of movement—in the axial direction toward the sealing section 30 of the sealing head 28. By virtue of the fluid's approaching the sealing section 30 and the flushing of the sealing zone 62 thereby, improved lubrication, cooling and cleaning of the sealing zone 62 can be achieved. As a result, the formation and deposition of oil carbon or embedment of carbon in the sealing section 30 of the seal element 20 can be counteracted. Any oil carbon deposits already formed and possibly accumulated at the sealing section 30 of the seal element can be flushed away by the fluid.

The sealing head may have return conveying profiles 76 on the low-pressure side N, by which on the one hand the drag-back capability of the seal arrangement 10 and on the other hand additional lubrication of the sealing section 30 of the sealing head 28 sitting against the sealing surface 32 can be achieved from the low-pressure side N. In the process, the return conveying profiles 76 may be designed in a manner corresponding to the first and second flow elements 66, 68 and disposed on the high-pressure side H of the seal element 20.

According to an alternative embodiment of the seal arrangement 10, the arrangement is provided with an axially-sealing seal element 20, i.e. an axial shaft sealing ring. In this case, the sealing surface 32 shown in FIG. 5 may be annular disk-shaped and formed approximately by an annular collar 78 of the second machine part 14. The annular collar 78 may be integrally formed, welded or glued to the second machine part 14.

In such a construction of the seal arrangement 10, the sealing section 30 of the sealing head 28 sits against the sealing surface 32 biased in an axial direction relative to the movement axis 16. The connecting section thus extends in an axial direction from the sealing head 28 to the base section 24 of the seal element 20 and has a non-linear cross-sectional profile in the axial direction. The first and second flow elements 66, 68 are disposed on the high-pressure side of the seal head 28.

Figure 6:
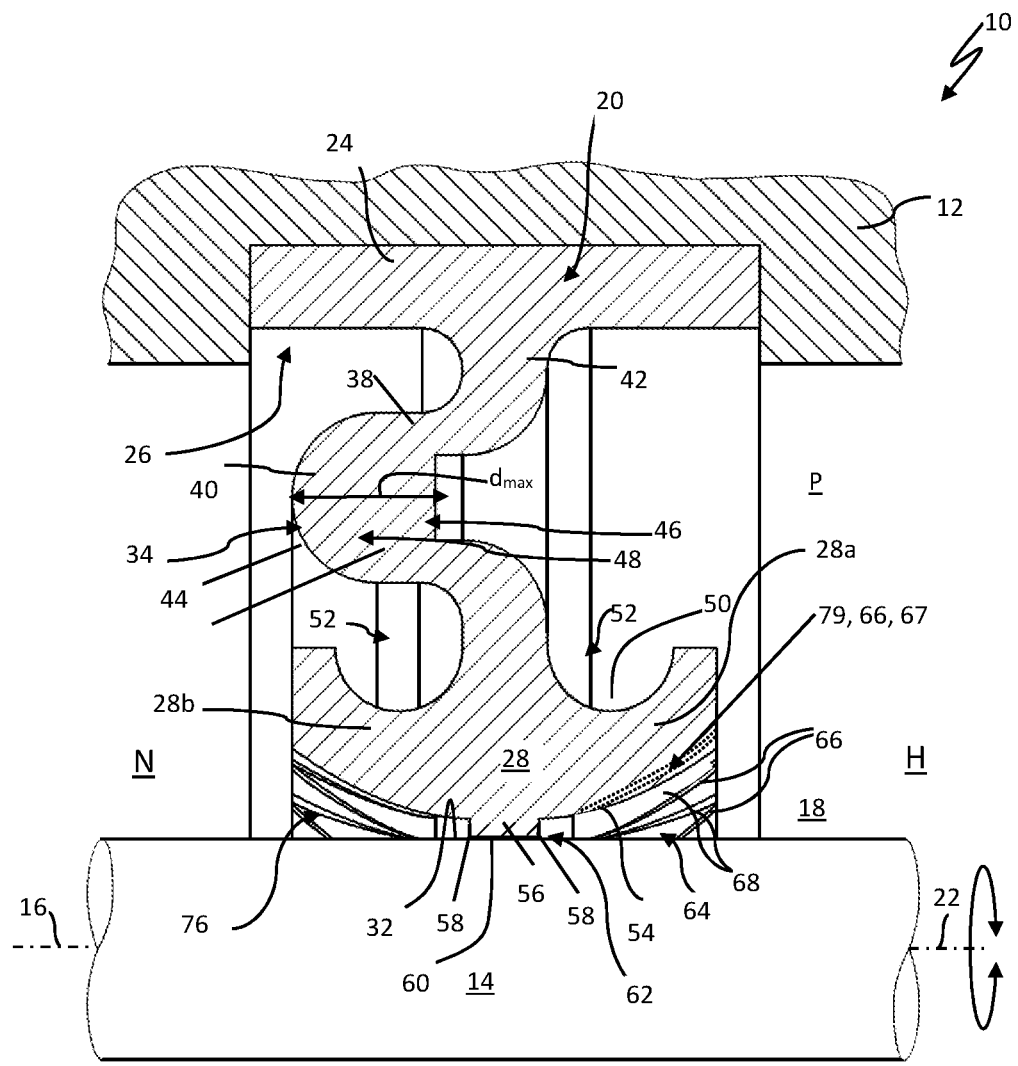
FIG. 6 a sealing arrangement in which the flow elements are partially designed as a penetration hole of the sealing head.

The first and/or the second flow elements 66, 68 of the sealing head 28 of the above-described seal arrangements 10 can also be designed at least in sections as penetration holes 79 of the sealing head 28, as shown in the embodiment shown in FIG. 6 with a dashed line.

Figure 7:
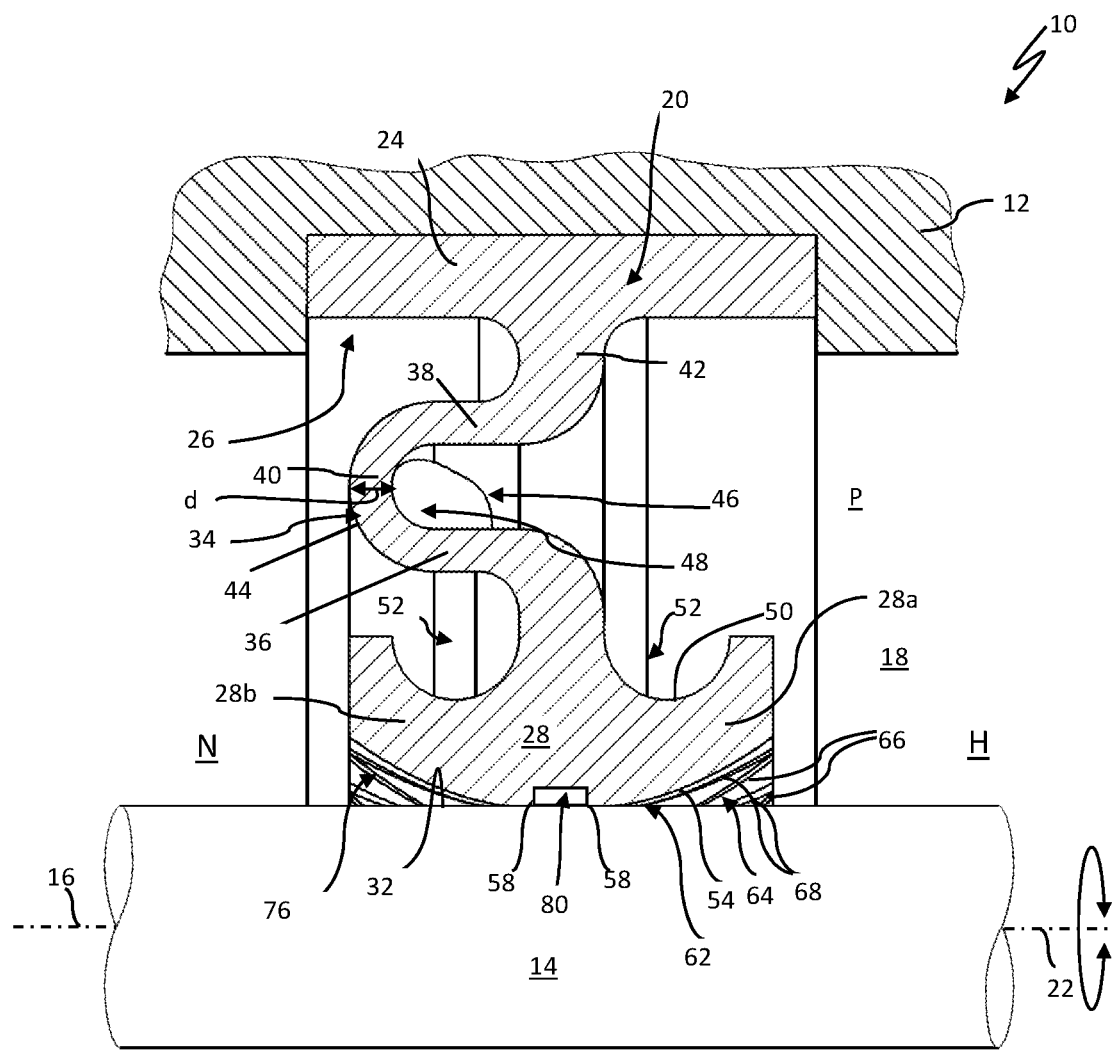
FIG. 7 a seal arrangement in which the sealing section of the sealing head of the seal element is provided with a running groove.

According to an alternative embodiment, the seal element 10 can also have at least one running groove or profile groove 80 or a plurality of mutually parallel annular profile grooves 80 in the area of sealing section 30 thereof instead of the tread of FIG. 7. As a result, in each case a sharp-edged or, if required, a rounded sealing edge on the sealing head can be realized on both sides of the profile groove 80. The running groove or profile groove 80 represents a depression of the end face 54 of the sealing head. The groove flanks of the profile groove 80, which are not designated in greater detail in FIG. 7, are connected to the end face (or its surface) via sealing edges 58.

Figure 8:
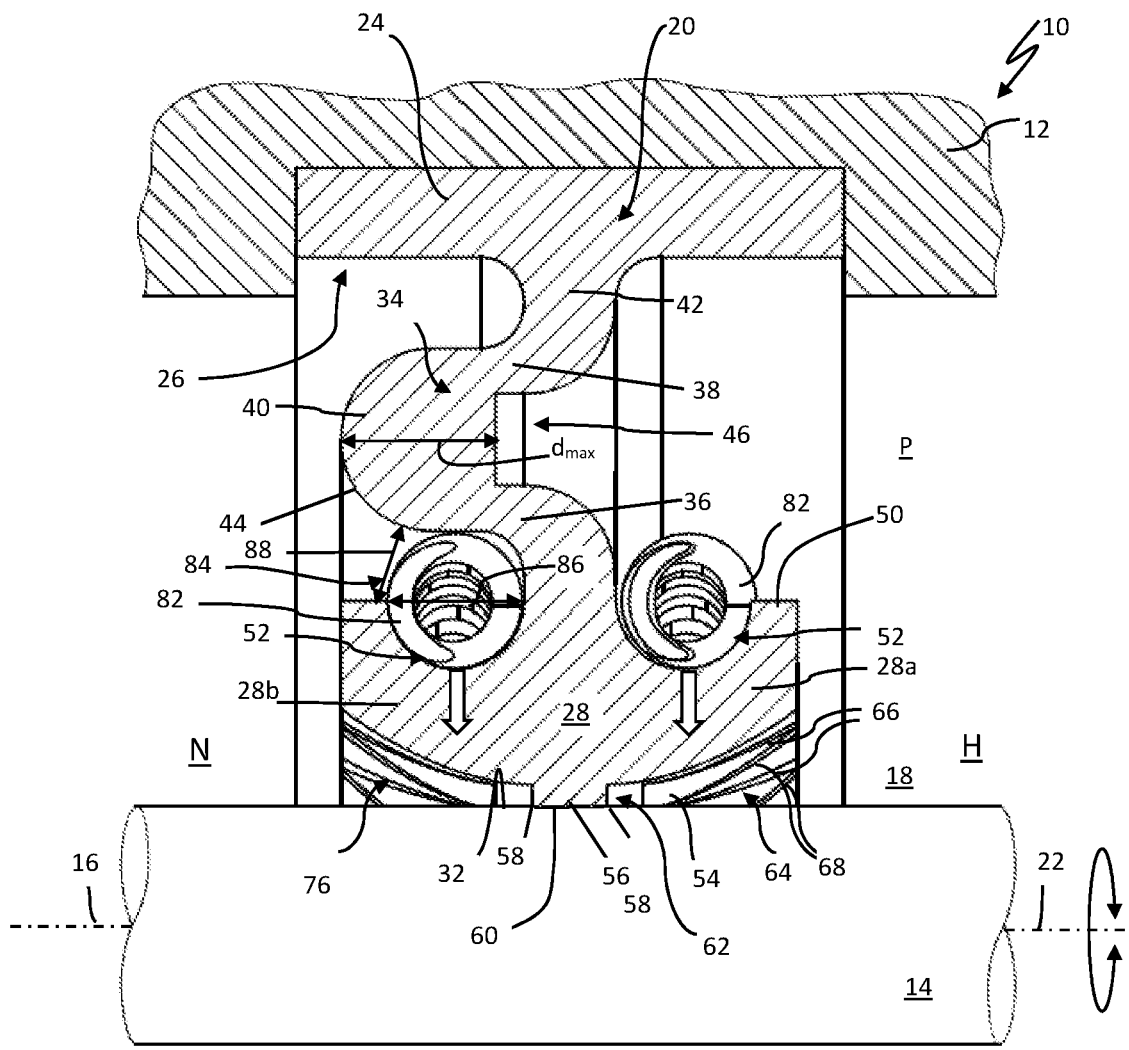
FIG. 8 a seal arrangement similar to the seal arrangement of FIG. 1, in which the sealing head is partially or solely held against the sealing face by two elastically-deformable biasing elements designed as a worm springs.

FIG. 8 shows a seal arrangement 10 in which the sealing head 28 is tensioned against the sealing surface 32 of the second machine part 14 by means of two elastically-deformable biasing elements 82. This biasing may be superimposed on the above-described bias function of the connection portion 34 or can completely replace such a bias function of the connection portion 34. The two biasing elements 82 are each designed as a separate component to the seal element 20 and held on both sides of the connecting section 34, i.e. the low-pressure side and high-pressure side, in one of the rear annular grooves 52 of the sealing head 28. For this purpose, the annular grooves 52 each have an opening 84 with a smaller opening width 88 compared to the inner diameter 86 of the respective annular groove 52. In this way, the biasing elements 82 are held captive on the seal element 20 during operation of the seal arrangement 10. The biasing elements 82 may be designed according to FIG. 8, in particular in the form of a worm spring. Due to the fact that the torque capacity of the connecting section 34 in the material-weakened areas 48 and its non-material-weakened areas differs in the circumferential direction of the seal element, a contact pressure profile of the sealing section 30 results at the sealing surface 32 of the second machine part 14 in the circumferential direction of the seal element 20 during operation of the seal arrangement 10. This can improve the lubrication and thus the life of the seal element 20.

Figure 9:
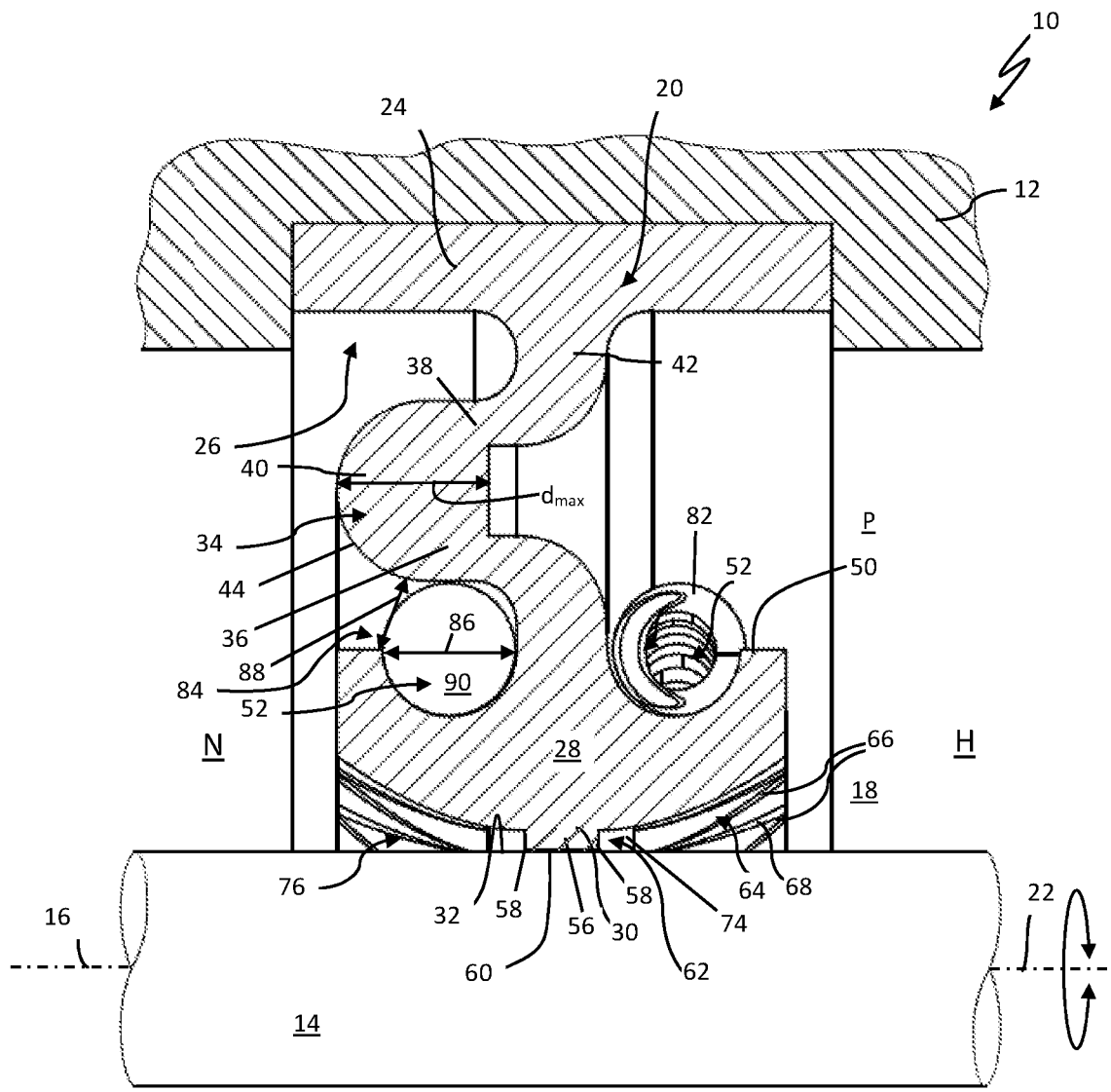
FIG. 9 a sealing arrangement similar to FIG. 8, in which the sealing head of the seal element is held against the sealing surface on the high-pressure side by a biasing element designed as a worm spring and by a support ring on the low-pressure side.

FIG. 9 shows a seal arrangement 10 which essentially differs from the exemplary embodiment shown in FIG. 8 in that a support ring 90 is disposed in the low-pressure-side annular groove 52 of the sealing head 28. An elastically-deformable biasing element 82, here in the form of a worm spring, is disposed in the annular groove 52 of the sealing head 28 disposed in the high-pressure side.

The support ring 90 is made of a material having a larger elasticity modulus than the elastomer material of the seal element 20. The support ring 90 is dimensionally stable and not or only slightly deformable by forces occurring during operation of the seal arrangement 10. By means of the support ring 90, the sealing head 28 of the seal element 20 can be held against the sealing surface 32 at a uniform distance and over its full scope at a constant or substantially constant contact pressure on the low-pressure side even when high-pressure area H is under pressure. In other words, due to the elastic deformability of the seal element 20, the support ring 90 can indirectly act as a biasing element. When the high-pressure side H is pressurized, the sealing head 28 as well as the connecting section 34 can be supported on the support ring in an axial direction relative to the movement axis 16. In addition, the connecting section 34 can be supported on the support ring 90 with its first leg 36 or its back portion 40 in the direction of the sealing surface, i.e. here in a direction radial to the movement axis. In this way, a tilting moment, which acts on the sealing head via the connecting section, and thus an undesirable tilting of the sealing head 28 relative to the movement axis 16 are counteracted. When a pressurization of the high-pressure side H occurs, undesirable leakage of the fluid from the high-pressure side H to the low-pressure side N, in other words undesirable blowby, can be avoided.

The profile system 64 of the seal element 20 of the seal arrangements explained above can also have one or more flow elements on the high-pressure side, which each extend away from the sealing head 28 in the form of a profile projection. Such flow elements may alternatively or additionally be disposed on the sealing head 28. These flow elements are preferably disposed on the end face 54 of the sealing head 28 facing the sealing surface 32 and/or on a side flank of the sealing head, as explained in more detail below in connection with FIGS. 11 to 14.

Figure 10:
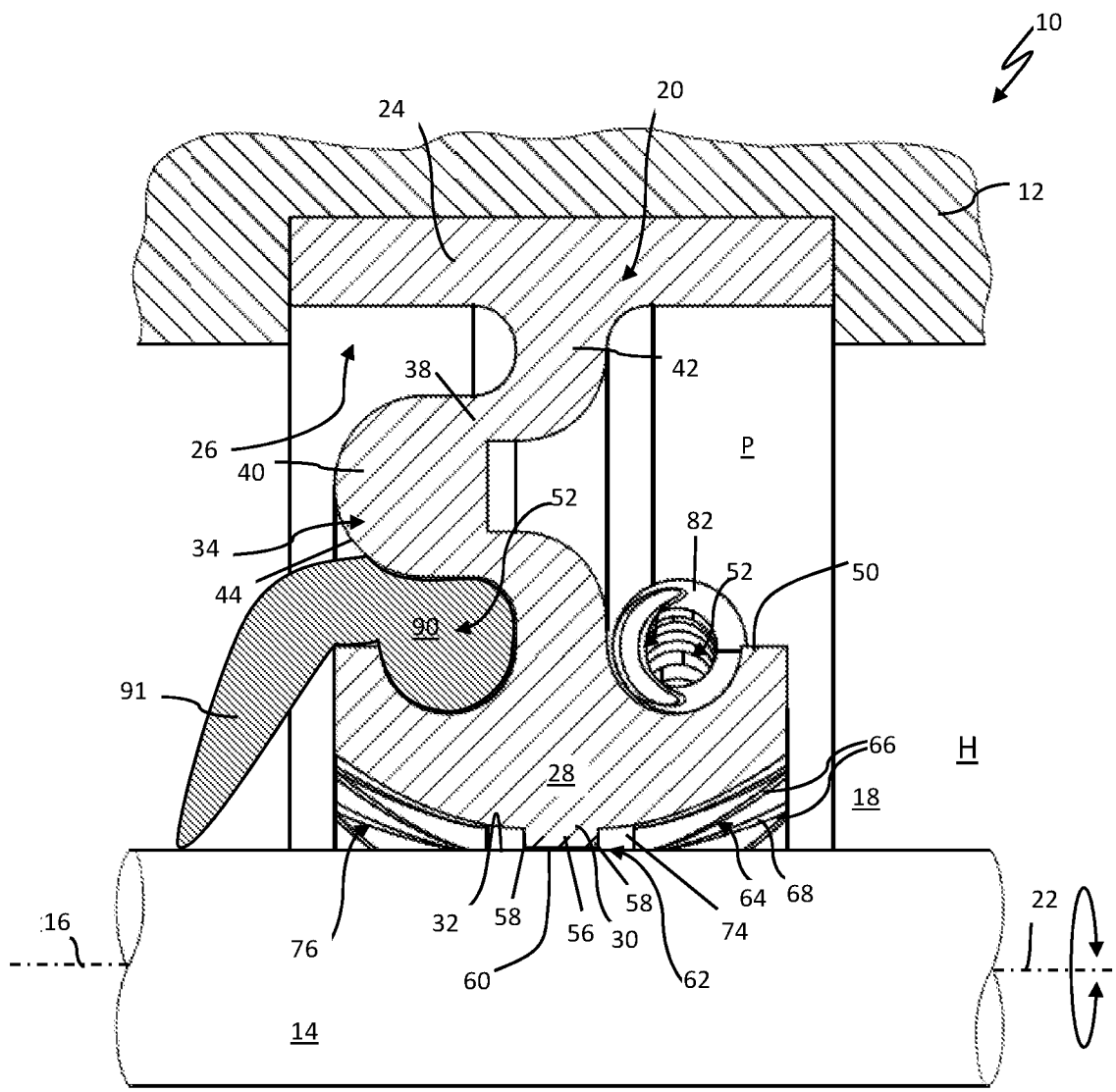
FIG. 10 a seal arrangement similar to the seal arrangement of FIG. 9 in which the support ring of the seal element disposed on the low-pressure side additionally comprises a wiping or sealing lip which circumferentially sits against the sealing surface.

According to the seal arrangement 10 shown in FIG. 10, the support ring 90 may be provided with an (annular) sealing or wiping lip 91 which sits circumferentially against the sealing surface 32 of the second machine part.

Figure 11:
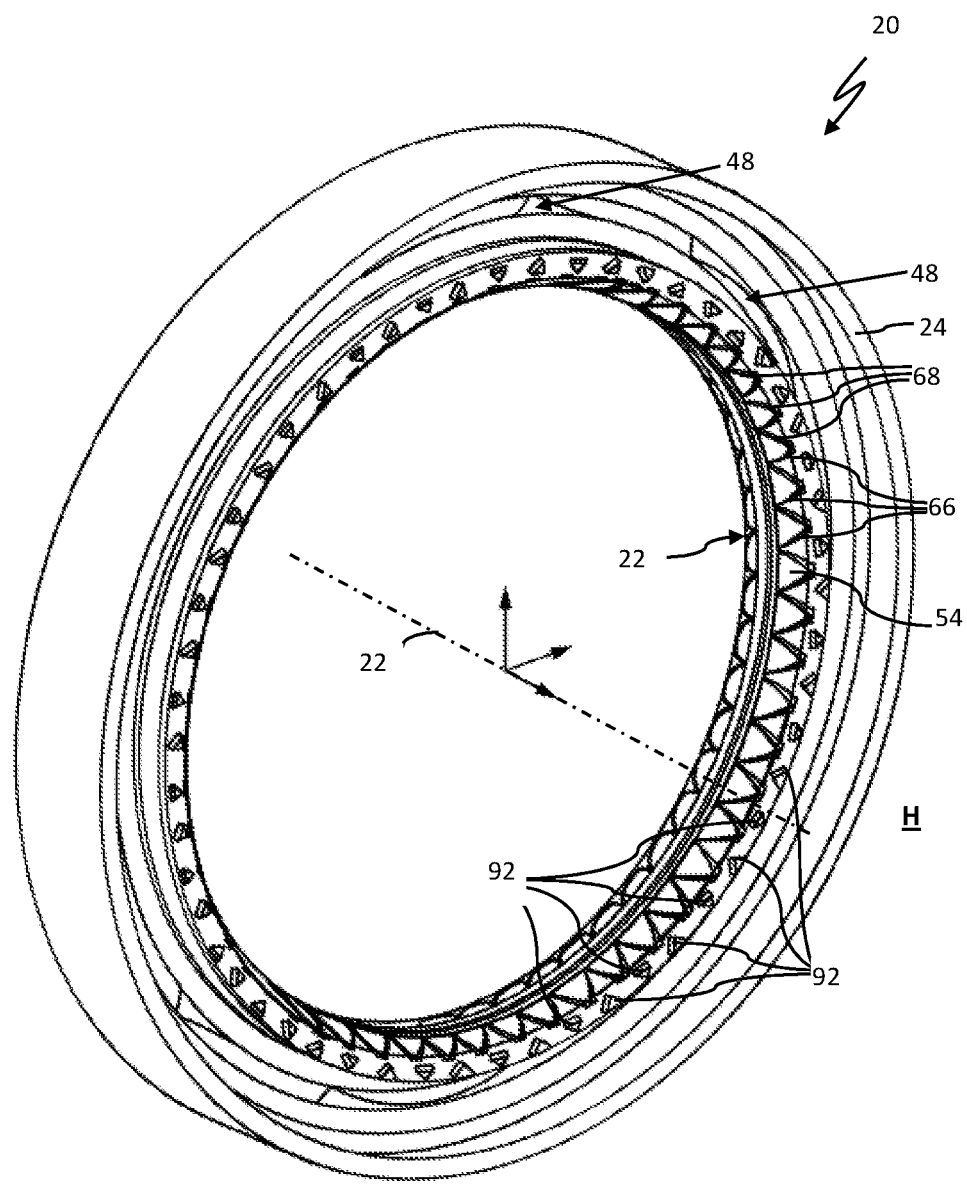
FIG. 11 an alternative embodiment of a seal element, which has groove-shaped flow elements formed as profile extensions, in an exposed perspective view.
Figure 12:
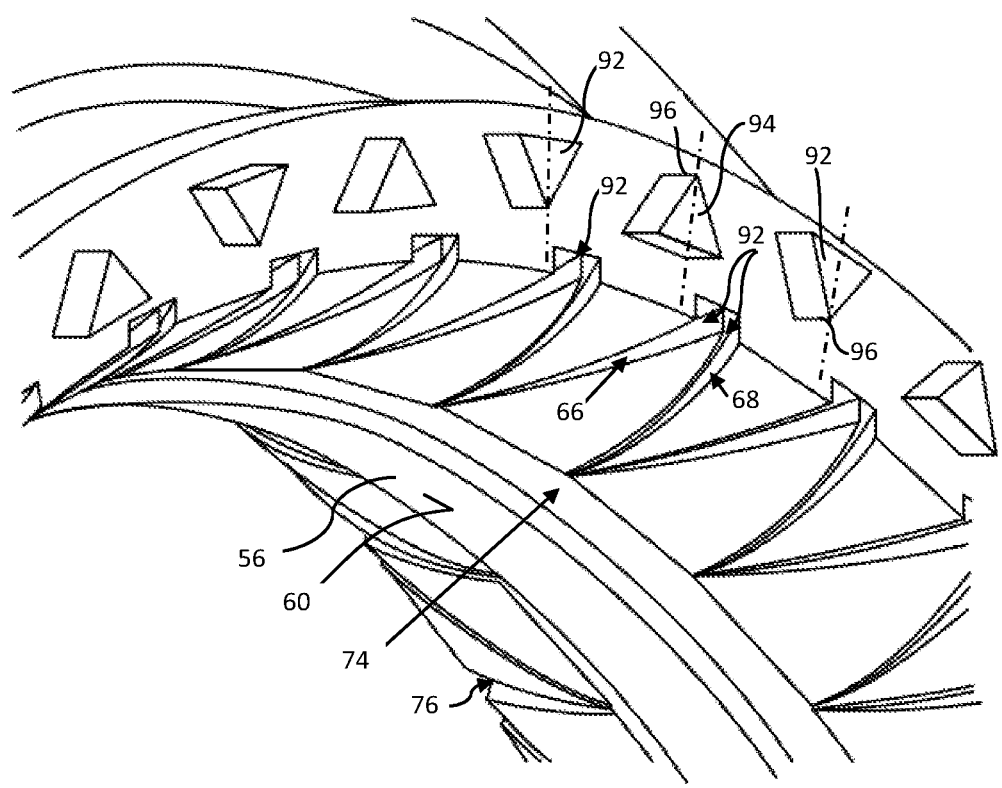
FIG. 12 the seal element according to FIG. 11 in a partial detail view.

The seal element 20 shown in FIGS. 11 and 12 has third and fourth flow elements 92, 94 in addition to the first and second flow elements 66, 68 described above. These flow elements 92, 94 each have a triangular basic or cross-sectional shape. The third flow elements point with their tip 96 in the direction of the central axis 22 of the seal element 20, while the tips 96 of the fourth flow elements point away from the central axis 22.

The third and fourth flow elements 92, 94 are disposed alternatingly in the circumferential direction of the seal element 20 in a row in succession. It is self-evident that the flow elements 92, 94 can also each be disposed in groups of several or in a multi-row arrangement on the sealing head.

The third and fourth flow elements 92, 94, designed as profile projections, form inflow surfaces for the fluid through which the fluid can move along the sealing gap 18 toward the sealing zone 62 (FIG. 1) of the seal arrangement 10 or away from the sealing zone 62—depending on the direction of rotation—analogous to the side flanks of the groove-shaped first and second flow elements 66, 68. In terms of their shape, size, and spatial distribution pattern on the seal element 20, the profile projections may be matched to the position and spatial distribution pattern of the high-pressure-side openings of the groove-shaped first and second flow elements 66, 68 of the seal head 28 in order to provide a sufficiently large volumetric flow of the fluid per unit time to the sealing section or the sealing zone 62 during operation of the seal arrangement 10.

Figure 13:
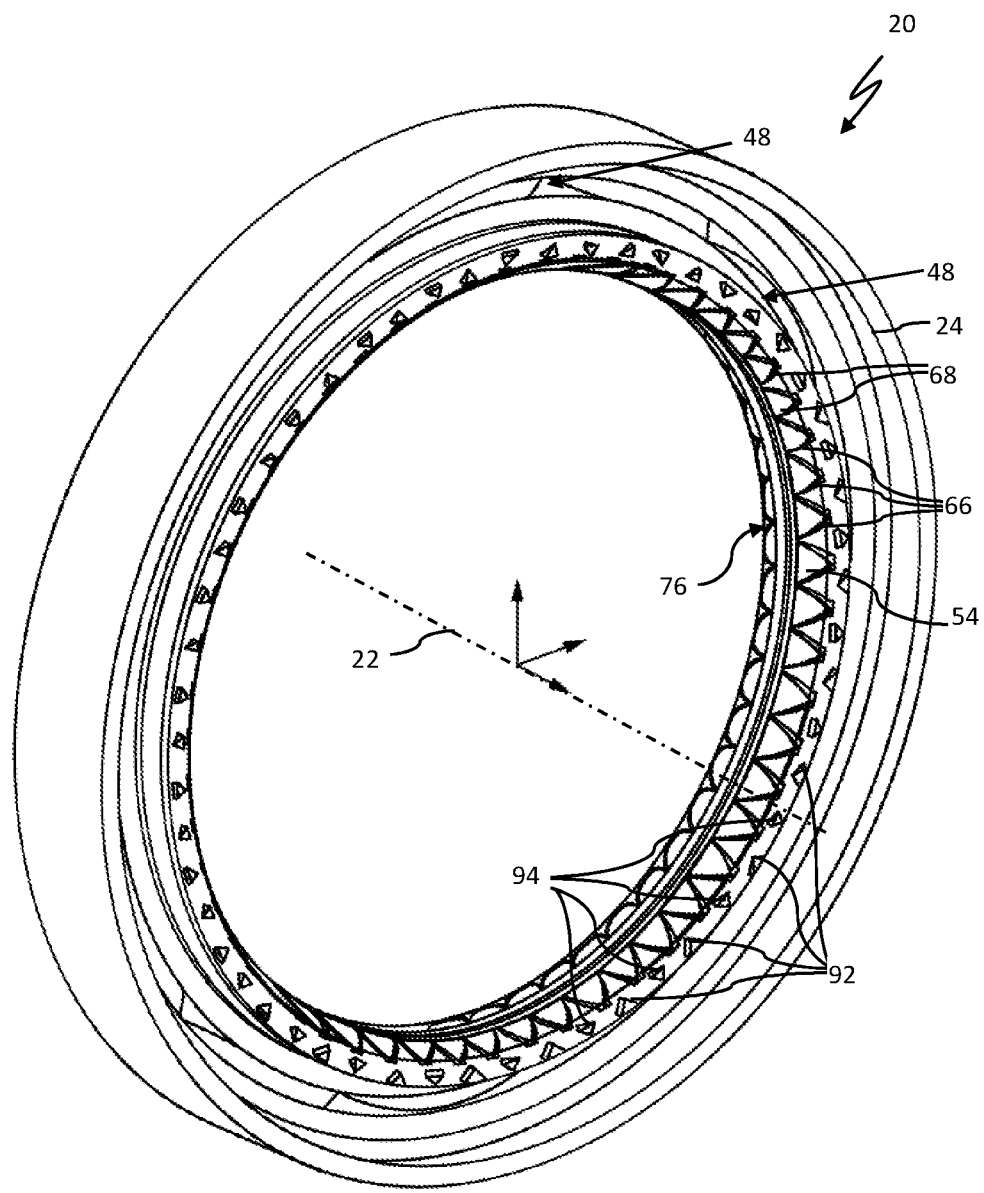
FIG. 13 a seal element similar to the seal element according to FIGS. 11 and 12 in which the profile-extension-like flow elements are designed as tetrahedra.
Figure 14:
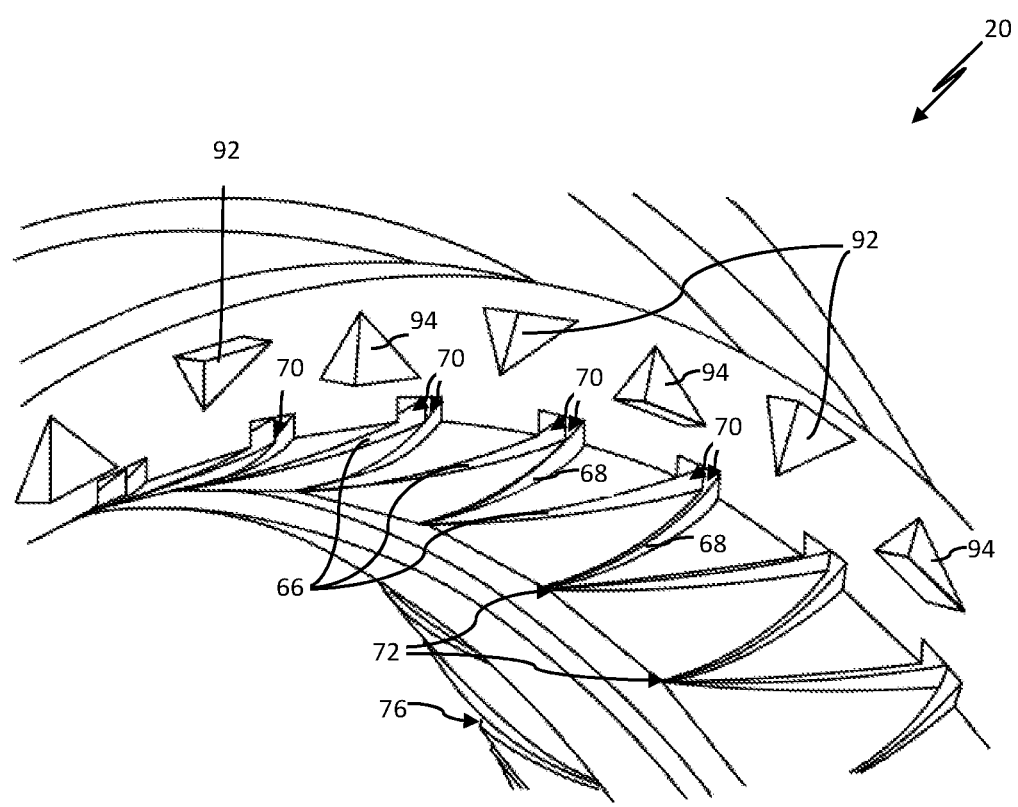
FIG. 14 the seal element according to FIG. 13 in a partial detail representation.
Figure 15:
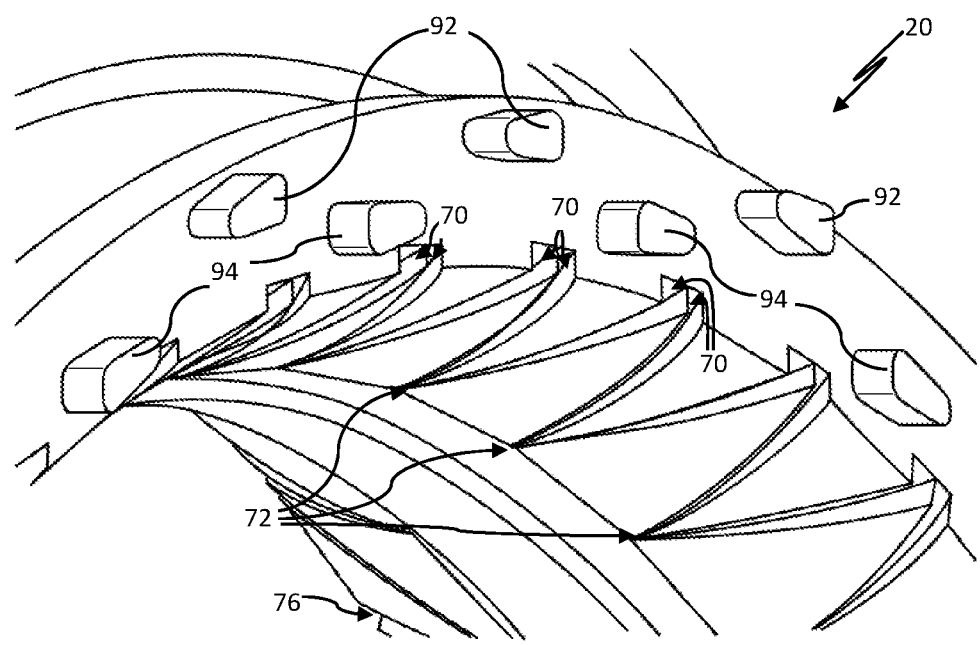
FIG. 15 a seal element with trapezoidal flow elements, in a partial detail view.
Figure 16:
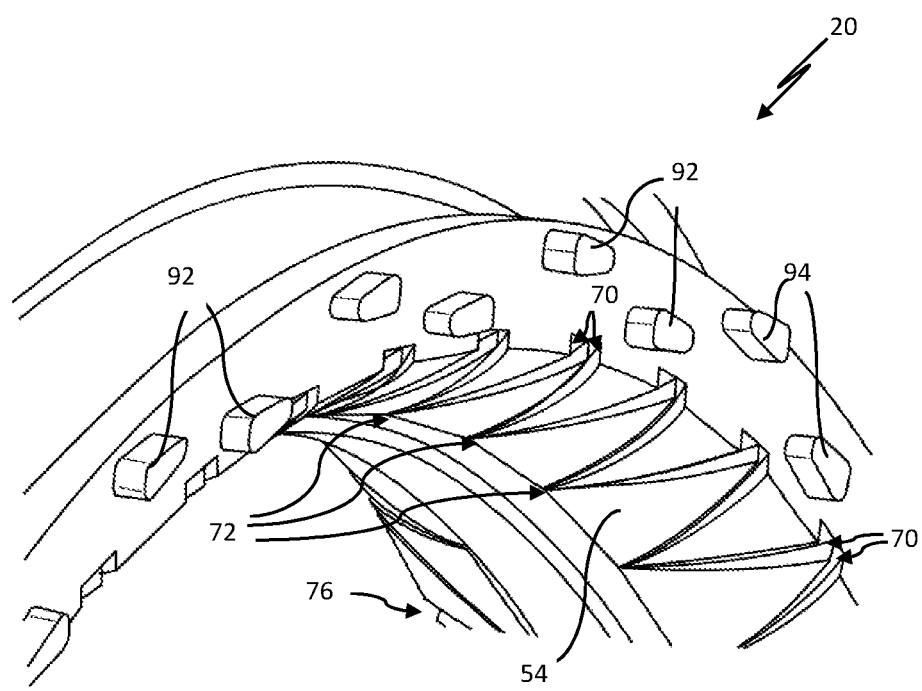
FIG. 16 a seal element similar to the seal element shown in FIG. 15, in a partial detail view.

According to the exemplary embodiment shown in FIGS. 13 and 14, the flow elements 92, 94 designed as a profile projection may also have a rhomboid or, in accordance with the exemplary embodiments shown in FIGS. 15 and 16, a trapezoidal or approximately trapezoidal shape.

Figure 17:
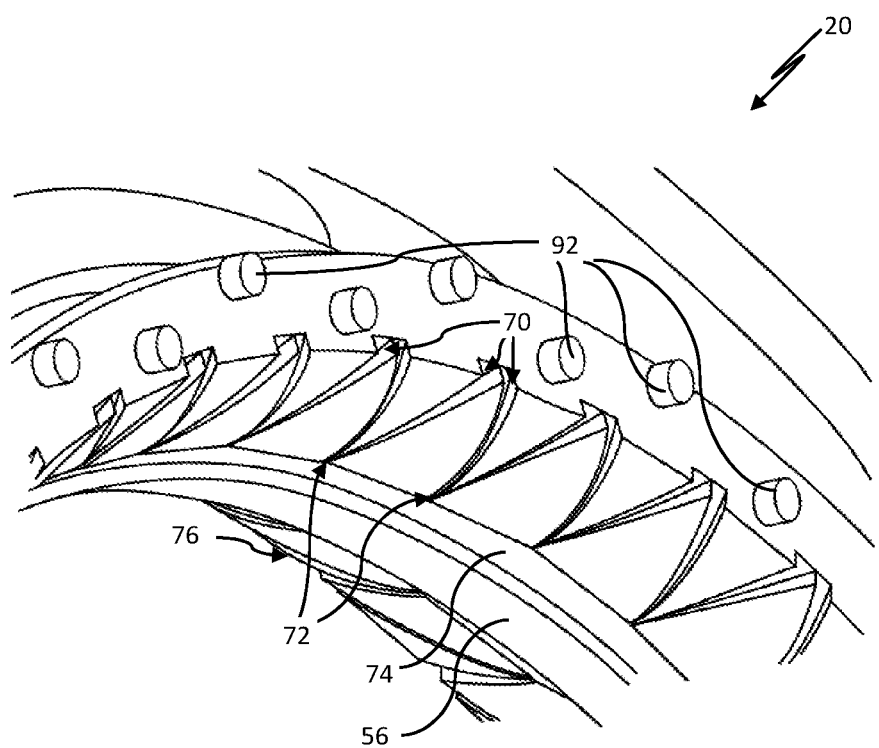
FIG. 17 a seal element with cylindrical second flow elements, in a partial detail view.

In the exemplary embodiment shown in FIG. 17, the flow elements 92, 94 designed as profile projections have a circular-cylindrical basic shape and consequently a circular cross-sectional shape. These third flow elements 92 are disposed in a double-row in the circumferential direction of the seal element 20 and on respective gaps relative to each other so that regardless of the circular cross-sectional shape of the flow elements 92, 94, a directed fluid flow along the sealing gap 18 (FIG. 1) can be generated.

In operation, the fluid located on the high-pressure side H can be effectively mixed by the flow elements 92, 94 formed as profile projections, and turbulences can be generated in the fluid through which the particulate impurities contained in the fluid are further comminuted and slurried. In this way, a damaging effect of the particles on the sealing surface or the seal element 20 can be further reduced.

What is claimed is:

1. A seal arrangement comprising:
   a first and a second machine part, which are spaced apart from one another with formation of a sealing gap and are movable relative to one another about a movement axis;
   a seal element formed as a radial shaft sealing ring having a base section which is held on a seal retaining structure of one of the two machine parts and
   a sealing head, a sealing section of which sits against a sealing surface of the respective other machine part in a dynamic sealing manner to seal a high-pressure side of the sealing gap against a low-pressure side of the sealing gap, the high-pressure side being pressurizable with a fluid;
   wherein the sealing section has an end face convexly shaped in cross-section and a tread extending out from the sealing head at the end face, wherein the tread has a continuous tread surface which sits against the sealing surface;
   wherein the sealing head and the base section are connected to each other via an elastically-deformable connecting section of the seal element having, at least partially, a non-linear cross-sectional profile wherein the connecting section has a first and a second leg which extend parallel or substantially parallel to the sealing surface towards the low-pressure side and which are interconnected via a back portion, the two legs each having an angled end piece which extends in a radial direction to the movement axis, wherein the end piece of the one leg is formed centrally on the sealing head and the end piece of the other leg is integrally formed on the base section, wherein the elastically-deformable connecting section does not extend towards to the high-pressure side;
   wherein a clearance is formed between the two legs of the connecting portion, said clearance surrounding the sealing head circumferentially and which is directly limited in the radial direction solely by the two legs of the connecting portion;
   wherein the clearance is fluidly connected with the high-pressure side of the seal assembly and wherein the connecting portion has a plurality of material-weakened areas in the radial direction at the height of the back portion which are disposed in the circumferential direction of the seal element, uniformly spaced apart in succession.

2. The seal arrangement according to claim 1, wherein the connecting section causes a biased sealing contact of the sealing head against the sealing surface.

3. The seal arrangement according to claim 1, wherein the connecting section in the material-weakened areas each has a thickness d which is less than 90% of the maximum thickness dmax of the connecting area.

4. The seal arrangement according to claim 1, wherein the sealing head, on its rear side facing the base section, has at least one support structure in or on which a biasing element, in particular a worm spring or a rubber-elastic deformable clamping ring, is held in order to force the sealing head against the sealing surface.

5. The seal arrangement according to claim 4, wherein support ring has a sealing or wiping lip which sits against the sealing surface.

6. The seal arrangement according to claim 1, wherein the sealing head has on both sides of the connecting section, i.e. on the low-pressure side and the high-pressure side, in each case a support structure, wherein in each case an elastically-deformable biasing element, in particular a worm spring, is held in/on both support structures, or a support ring is held in/on the support structure disposed on the low-pressure side and an elastically-deformable biasing element, in particular a worm spring, is held in/on the high-pressure-side support structure.

7. The seal arrangement according to claim 6, wherein support ring has a sealing or wiping lip which sits against the sealing surface.

8. The seal arrangement according to claim 1, wherein the seal element is provided on the high-pressure side with at least one flow element through which a fluid flow is effectuated in a relative movement of the two machine parts about the axis of movement such that the sealing head is approached by the fluid on the high-pressure side in the area of sealing section of the sealing head.

9. The seal arrangement according to claim 8, wherein the flow element is formed at least in sections as a groove and/or as a penetration hole in the seal element.

10. The seal arrangement according to claim 9, wherein the groove is open at both ends.

11. The seal arrangement according to claim 10, wherein the groove on the sealing section side is fluidically connected to a circumferential groove of the sealing head.

12. The seal arrangement according to claim 11, wherein the circumferential groove is limited laterally directly by the sealing section sitting against the sealing surface of the sealing head.

13. The seal arrangement according to claim 10, wherein the groove narrows, at least in areas, in the cross section thereof through which the fluid can flow in the direction of the sealing section of the sealing head.

14. The seal arrangement according to claim 9, wherein the groove is U-shaped and both openings of the groove point to the high-pressure side.

15. The seal arrangement according to claim 9, wherein the groove narrows, at least in areas, in the cross section thereof through which the fluid can flow in the direction of the sealing section of the sealing head.

16. The seal arrangement according to claim 8, wherein the flow element extends away from the sealing head.

17. The seal arrangement according to claim 16, wherein the flow element is integrally formed on the sealing head.

18. The seal arrangement according to claim 17, wherein the flow element has an oval, elliptical, circular, polygonal or triangular cross-sectional profile.

19. The seal arrangement according to claim 16, wherein the flow element has an oval, elliptical, circular, polygonal or triangular cross-sectional profile.

20. The seal arrangement according to claim 8, wherein the seal element is provided with one of a plurality of flow elements.

21. The seal arrangement according to claim 20, wherein the flow elements in the circumferential direction of the seal element are disposed in a row one after the other on the sealing head.

22. The seal arrangement according to claim 1, wherein the seal element at least partially consists of an elastomeric material.

23. A seal element for the seal arrangement according to claim 1.

24. The seal arrangement according to claim 1, wherein the connecting section in the material-weakened areas each has a thickness d which is less than 50% of the maximum thickness dmax of the connecting area.

25. The seal arrangement according to claim 1, wherein the seal element completely consists of an elastomeric material.

26. The seal arrangement according to claim 1, wherein the seal retaining structure comprises a retaining groove.

27. A seal arrangement, comprising:
- a first and a second machine part which are spaced apart to form a sealing gap and are movable about a movement axis relative to each other;
- a seal element formed as an axial shaft seal with a base section which is arranged held on a seal retaining structure of one of the two machine parts and
- a sealing head which sits, dynamically sealing, against a sealing surface of the respective other machine part with a sealing portion to seal a high-pressure side of the sealing gap against a low-pressure side of the sealing gap, the high-pressure side being pressurizable with a fluid;
- wherein the sealing section comprises an end face convexly shaped in cross section and a tread extending away frontally from the sealing head, wherein the tread has a continuous tread surface sitting against the sealing surface;
- wherein the sealing head and the base section are connected to each other via an elastically deformable connecting section of the seal element, which at least in sections has a non-linear U-shaped cross-sectional profile;
- wherein the connecting portion has a first and a second leg which extend parallel or substantially parallel to the sealing surface towards the low-pressure side and which are interconnected via a back portion, the two legs each having an angled end piece which extends in an axial direction to the movement axis, wherein the end piece of the one leg is integrally formed on the sealing head and the end piece of the other leg is integrally formed on the base section, wherein the elastically-deformable connecting section does not extend towards to the high-pressure side;
- wherein between the two legs of the connecting portion a clearance is formed, which surrounds the sealing head circumferentially and which is directly limited in the axial direction solely by the two legs of the connecting portion;
- wherein the clearance is fluidically connected to the high-pressure side of the seal arrangement, wherein the connecting portion has a plurality of material-weakened regions in the axial direction at the height of the back portion, which are arranged in the circumferential direction of the seal element, uniformly spaced from each other in succession.

28. The seal arrangement according to claim 2, wherein the seal retaining structure comprises a retaining groove.

* * * * *